US006993341B2

(12) United States Patent
Hunzinger (10) Patent No.: US 6,993,341 B2
(45) Date of Patent: Jan. 31, 2006

(54) UPLINK-DOWNLINK DIVERSITY FOR FAST CELL-SITE SELECTION

(75) Inventor: Jason F. Hunzinger, Carlsbad, CA (US)

(73) Assignee: Denso Corporation, Kariya (JP)

( * ) Notice: Subject to any disclaimer, the term of this patent is extended or adjusted under 35 U.S.C. 154(b) by 458 days.

(21) Appl. No.: 10/189,095

(22) Filed: Jul. 3, 2002

(65) Prior Publication Data

US 2003/0054812 A1    Mar. 20, 2003

Related U.S. Application Data

(60) Provisional application No. 60/323,472, filed on Sep. 18, 2001.

(51) Int. Cl.
*H04Q 7/20* (2006.01)
(52) U.S. Cl. ............... 455/450; 455/436; 455/434
(58) Field of Classification Search ......... 455/434, 455/435.2, 450, 453, 451, 452, 444
See application file for complete search history.

(56) References Cited

U.S. PATENT DOCUMENTS 5,864,760 A * 1/1999 Gilhousen et al. ......... 455/442
6,157,668 A * 12/2000 Gilhousen et al. ......... 375/130
6,507,572 B1 * 1/2003 Kumar et al. ............. 370/335
2003/0195007 A1 * 10/2003 Hayashi et al. ........... 455/450

* cited by examiner

*Primary Examiner*—Nguyen Vo
*Assistant Examiner*—Julie E Stein
(74) *Attorney, Agent, or Firm*—Morrison & Foerster LLP (57) ABSTRACT

The present invention is directed to forward link and reverse link diversity in a wireless telecommunications network. The present invention solves the reverse link/forward link dependence between a mobile station and a base station of a network by purposely selecting different base stations or sectors of a base station for reverse-link and forward-link transmissions. In one embodiment, reverse link traffic channel transmissions are targeted to a different base station than the base station from which the forward link traffic channel transmissions originate and respective control information of these channels are embedded or transmitted with the opposite link. Such diversity may be activated only in signal conditions that have a certain predefined value or mobile station locations that exhibit a sufficient chance of experiencing a forward or reverse link failure. Activation of the diversity scheme may also depend on whether more than one base station or sector has link-quality within an appropriate range or the degrading effect of the increased power on capacity is acceptable.

27 Claims, 8 Drawing Sheets

FIG. 1

PRIOR ART

PRIOR ART

UPLINK-DOWNLINK DIVERSITY FOR FAST CELL-SITE SELECTION

CROSS-REFERENCE TO RELATED APPLICATIONS

Embodiments of the present invention claim priority from U.S. provisional patent application Ser. No. 60/323,472 entitled "Uplink-Downlink Diversity For Fast Cell-Site Selection," filed Sep. 18, 2001, the contents of which are incorporated herein by reference for all purposes.

BACKGROUND OF THE INVENTION

1. Field of the Invention

The present invention relates, generally, to methods and apparatuses for communicating voice and data in a wireless telecommunications network. More precisely, the invention is directed to forward link and reverse link diversity in a wireless telecommunications network.

2. Description of Related Art

Cellular telephones not only provide a means for emergency communications but also are rapidly becoming a primary form of communication in today's society. As cellular telephone usage becomes widespread, cellular telephone networks are becoming increasingly prevalent and are providing coverage over larger areas to meet consumer demands.

Figure 1:
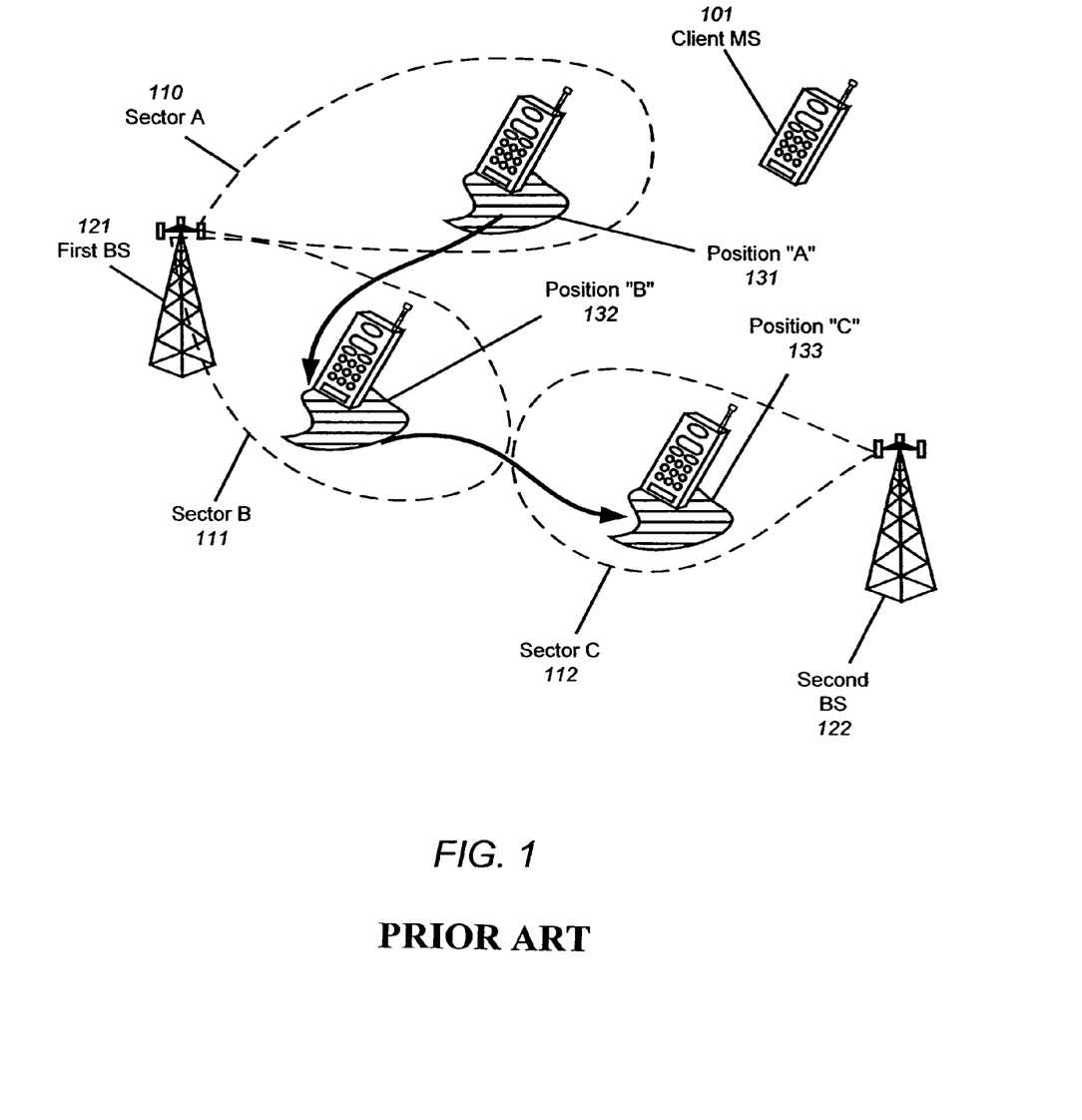
FIG. 1 is a prior art diagram of a roving mobile communication terminal moving amongst different locations between sectors in a wireless communication system.

FIG. 1 depicts an example of a mobile station (MS) 101 operated by a mobile user that roves through a geographic area served by a wireless infrastructure including a first base station (BS) 121 with wireless sectors A 110 and B 111, and a second BS 122, with a sector C 112. In the course of such roving, MS 101 travels from position A 131 to position B 132 to position C 133, and will, as a matter of course, experience variations in signal strength and signal quality of the forward and reverse links associated with the base station or base stations that it is in contact with. Signal strength and signal quality can be especially undependable near the edges of the sectors, such as when MS 101 transitions from the area defined by the dotted line of Sector A 110 to the area defined by the dotted line of Sector B 111, or from Sector B 111 to Sector C 112. It is in these transition areas, as well as other areas of weak signal strength or poor signal quality, where dropped connections are likely to occur.

Figure 4:
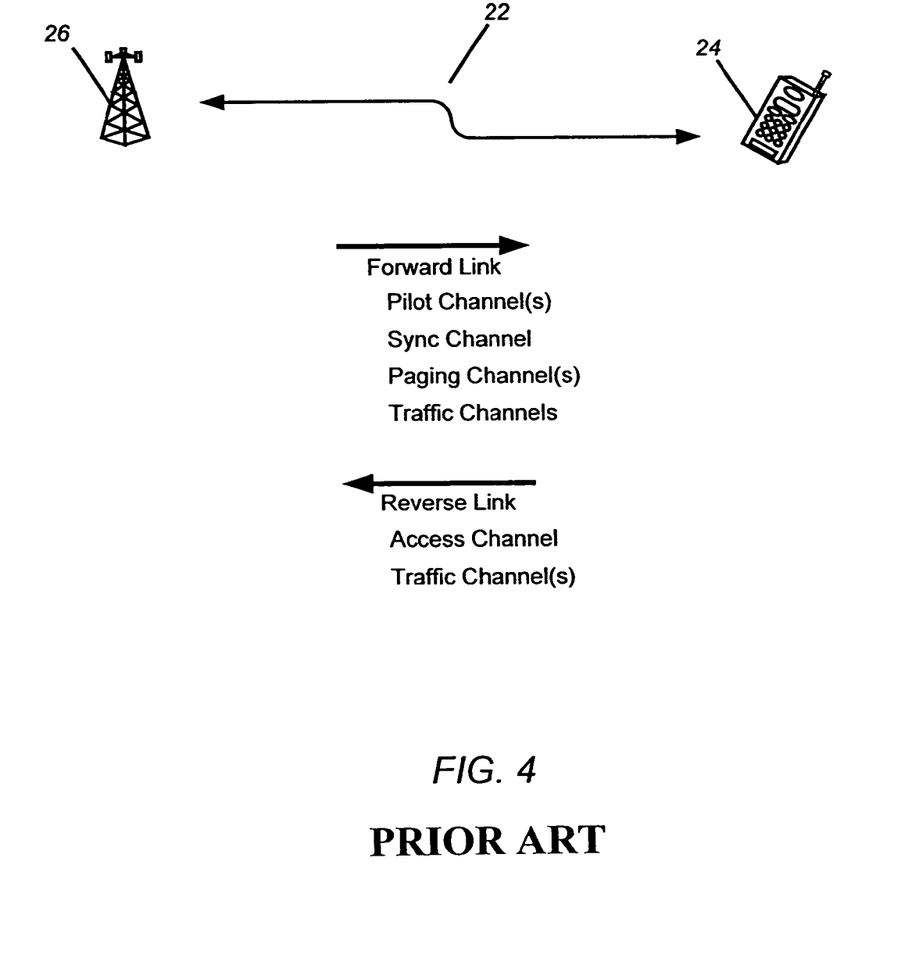
FIG. 4 illustrates an exemplary prior art communication link between a mobile station and a base station in a wireless communication system.

A dropped connection will occur even if only one of the forward and reverse links fails. This is due to a weakness in existing wireless systems. In existing systems, the forward and reverse link pairs originate from and are transmitted to the same base station or base stations in the case of soft handoff. FIG. 4 illustrates an exemplary link 22 between MS 24 and BS 26. Communications from BS 26 to MS 24 are called the forward link or downlink, and communications from MS 24 to BS 26 are called the reverse link or uplink.

The forward and reverse links utilize a number of forward and reverse channels. For example, BS 26 broadcasts on a plurality of forward channels. These forward channels may include, but are not limited to, one or more pilot channels, a sync channel, one or more paging channels, and multiple forward traffic channels. The pilot, sync, and paging channels are referred to as common channels. The common channel designation reflects that the channels are typically receivable by any and all mobile stations in the vicinity of BS 26. Generally, these common channels are not used to carry data (other than short message bursts for example), but rather are used to broadcast and deliver common and/or dedicated control information. Examples of common/overhead information include neighbor base station lists, access and monitoring parameters and configuration parameters. Examples of dedicated control information include pages, channel assignments and status requests.

The forward traffic channels are dedicated channels given that each forward traffic channel is intended for a specific mobile station and may carry user data. Typically, traffic channels convey both data and dedicated signaling such as handoff control messaging. Another type of traffic channel, called a dedicated control channel, may carry only signaling. Dedicated control channels are typically used in conjunction with a traffic channel or a supplemental channel (or data-only channel) such as a supplemental packet data channel that carries only data.

Forward traffic channels may also convey power control information for the reverse link that the mobile station is transmitting. Closed loop power control systems comprise measuring the received power level of the reverse link transmission as received at the base station and subsequently providing feedback in the form of up or down commands back to the mobile station via the forward link. These up or down commands may be in the form of information bits punctured onto the forward traffic channel. Other feedback information includes acknowledgements. Layer 2 acknowledgments for the receipt of individual signaling messages are typically embedded in the headers of signaling messages themselves on the opposite link.

Figure 5:
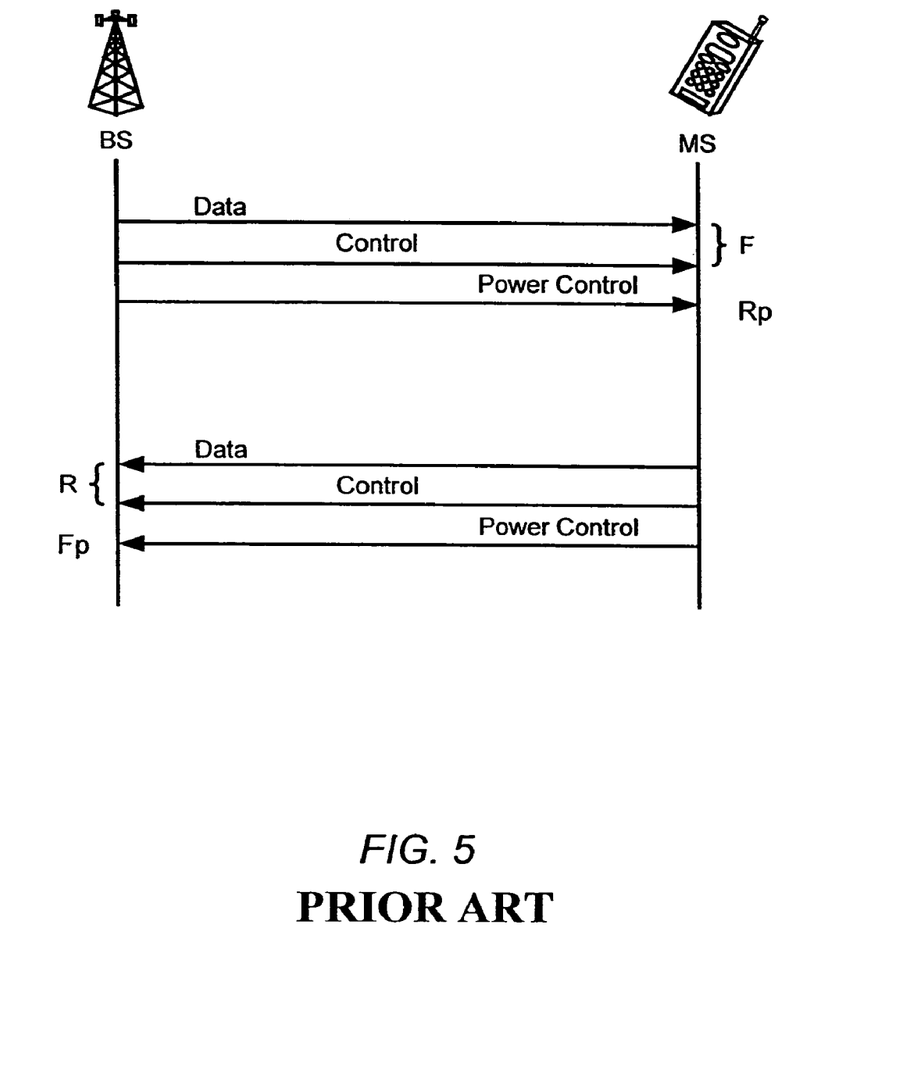
FIG. 5 illustrates exemplary prior art traffic channels between a mobile station and a base station in a wireless communication system.

As illustrated in FIG. 5, the forward traffic channels may contain data, control information and power control feedback for the reverse link. The data and control information are collectively identified as F in FIG. 5, while the power control feedback for the reverse link is identified as $R_p$. Similarly, the reverse link traffic channels may contain data and control information, which are referred to collectively as R in FIG. 5, and may contain power control feedback for the forward link referred to as $F_p$.

It should be noted that the power control feedback is typically implemented such that, in soft-handoff, even though the data and modulation of a traffic channel may be basically the same as transmitted from multiple base stations, the power control bits punctured onto the traffic channel may be different for each base station. Each base station punctures the traffic channel with the power control commands it deems appropriate. Thus, a mobile station may receive multiple contradicting power control commands. For this reason, standards typically specify that the mobile station follow specific rules. For example, a mobile station shall reduce its transmit power of the reverse link if any one base station requests the power to be reduced.

When the mobile station is transmitting to a base station on the reverse link, then it is also receiving a forward link from the same base station. For example, in FIG. 1, when MS 101 is at position A 131, it may be transmitting to and receiving from BS 121 in Sector A 110. If the reverse link to Sector A 110 fails, then the reverse link messaging that is contained in the reverse link will not reach BS 121. The messaging in the reverse link typically includes feedback information, such as acknowledgements, forward-link power-strength measurements or frame error indications, and this feedback, represented by $F_p$, may be used to control the power of the forward link. The reverse link may also contain messages requesting a new base station sector that is stronger than the current active sector(s). Since the feedback that the infrastructure depends on for proper link management is not available, the system is unable to recover from the reverse link failure and the call drops.

Similarly, if the forward link to Sector A 110 fails, the general procedures require that the MS 101 turn off the reverse link because it is no longer power controlled, i.e., MS 101 is no longer receiving $R_p$. These dependencies on each other are a weakness of the existing wireless systems. If one link fails, the entire connection fails. Furthermore, not only are the channels dependent upon one another because of signaling dependencies such as power control, but they also typically use the same physical link or medium, i.e., the same signal environment and path. Thus, there are two types of dependency: (1) control (such as feedback) and (2) link (same physical link).

Soft handoff, a state where a MS is in communication with two or more base stations simultaneously, improves the situation somewhat. Nevertheless, dropped connections can range from being a nuisance to devastating for cellular telephone users. For example, a dropped emergency 911 connection can be critical or even fatal. Dropped connections can create consumer frustration significant enough to cause the consumer to change service providers. Thus, the prevention of dropped connections is of major importance to cellular network providers.

SUMMARY OF THE INVENTION

The present invention solves the reverse link/forward link dependence problem by purposely selecting different sectors for reverse-link and forward-link transmissions. Such diversity in the forward and reverse links may be employed not only for fast cell-site selection, which allows for the selection of a base station from a whole group of base stations, but for soft handoffs where a mobile station is in communication with two or more base stations simultaneously.

In a first embodiment, reverse link traffic channel transmissions are targeted to a different base station than the base station from which the forward link traffic channel transmissions originate and respective control information of these channels are embedded or transmitted with the opposite link.

In a second embodiment, reverse link traffic channel transmissions are targeted to a different base station than the base station from which the forward link traffic channel transmissions originate but control information for the forward link is transmitted to one or more base stations including one or more base stations designated only for reverse traffic channel transmissions and control information for the reverse link is transmitted by one or more base stations including one or more base stations designated only for forward traffic channel transmissions.

In a third embodiment, a first pair of channels comprising a forward traffic channel and a supporting low-bandwidth feedback reverse link is in contact with a first base station. A second pair of channels comprising a reverse traffic channel and a supporting low-bandwidth feedback forward link are in contact with a second base station.

In all embodiments, the mobile station is afforded diversity and there is less chance of both links failing at the same time.

The embodiments can be modified such that the diversity scheme is activated only in signal conditions that have a certain predefined value or mobile station locations that exhibit a sufficient chance of experiencing a forward or reverse link failure. Also, activation of the diversity scheme may also depend on whether more than one sector has link-quality within an appropriate range or the degrading effect of the increased power on capacity is acceptable.

Furthermore, the invention may separate different combinations of dedicated and common channels and data and signaling information and is not limited to single base stations or specific channel types.

These and other features and advantages of embodiments of the present invention will be apparent to those skilled in the art from the following detailed description of embodiments of the invention, when read with the drawings and appended claims.

DETAILED DESCRIPTION OF PREFERRED EMBODIMENTS

In the following description of preferred embodiments, reference is made to the accompanying drawings which form a part hereof, and in which is shown by way of illustration specific embodiments in which the invention may be practiced. It is to be understood that other embodiments may be utilized and structural changes may be made without departing from the scope of the preferred embodiments of the present invention.

It should be further understood that although the description provided herein may primarily reference the CDMA communication protocol (code-based protocols) and the communication of messages for purposes of explanation only, embodiments of the present invention are applicable to other communication protocols and digital radio technologies generally, and include, but are not limited to, CDMA, TDMA, FDMA, GSM, GPRS, and the like. Furthermore, in addition to the communication of messages, other types of information blocks, frames or packets used in the communication of information fall within the scope of the present invention.

The current invention achieves increased diversity by the mobile station transmitting to one base station and receiving from a different base station at least part of a set of communications. The separation of links used by the forward and reverse channels achieves a degree of independence. Varying degrees of independence are possible.

In a first embodiment, data traffic and control information are separated and each link is dedicated for a specific traffic direction, i.e., one base station only transmits and at least one other base station only receives.

In a second embodiment, only data traffic is separated and control information is maintained as in normal communications, i.e. in soft handoff with multiple base stations. In other words, one base station transmits a data channel and does not receive the reverse link counterpart of that data channel, while another base station receives the counterpart reverse data channel but does not transmit the forward data channel. However, both base stations transmit and receive control information such as handoff information.

In a third embodiment, traffic and associated control feedback are separated such that reverse link traffic is transmitted to a first base station, feedback for the forward link (sent on a reverse link) is transmitted to a second base station, forward link traffic is received from the second base station and feedback for the reverse link (transmitted on a forward link) is received from the first base station. It should be noted that the reverse link transmissions are sent to a set of one or more receiving base stations, and the mobile station receives forward link transmissions from one or more base stations not in that set.

Wireless protocols are typically comprised of multiple layers such as a physical layer that includes power control and frame error feedback, a link layer that includes acknowledgment errors and a higher layer signaling protocol such as TCP/IP that includes acknowledgment feedback. Higher layer acknowledgments such as for TCP/IP packets may be considered as traffic data while frame error and power control are typically considered low level feedback.

Figure 2A:
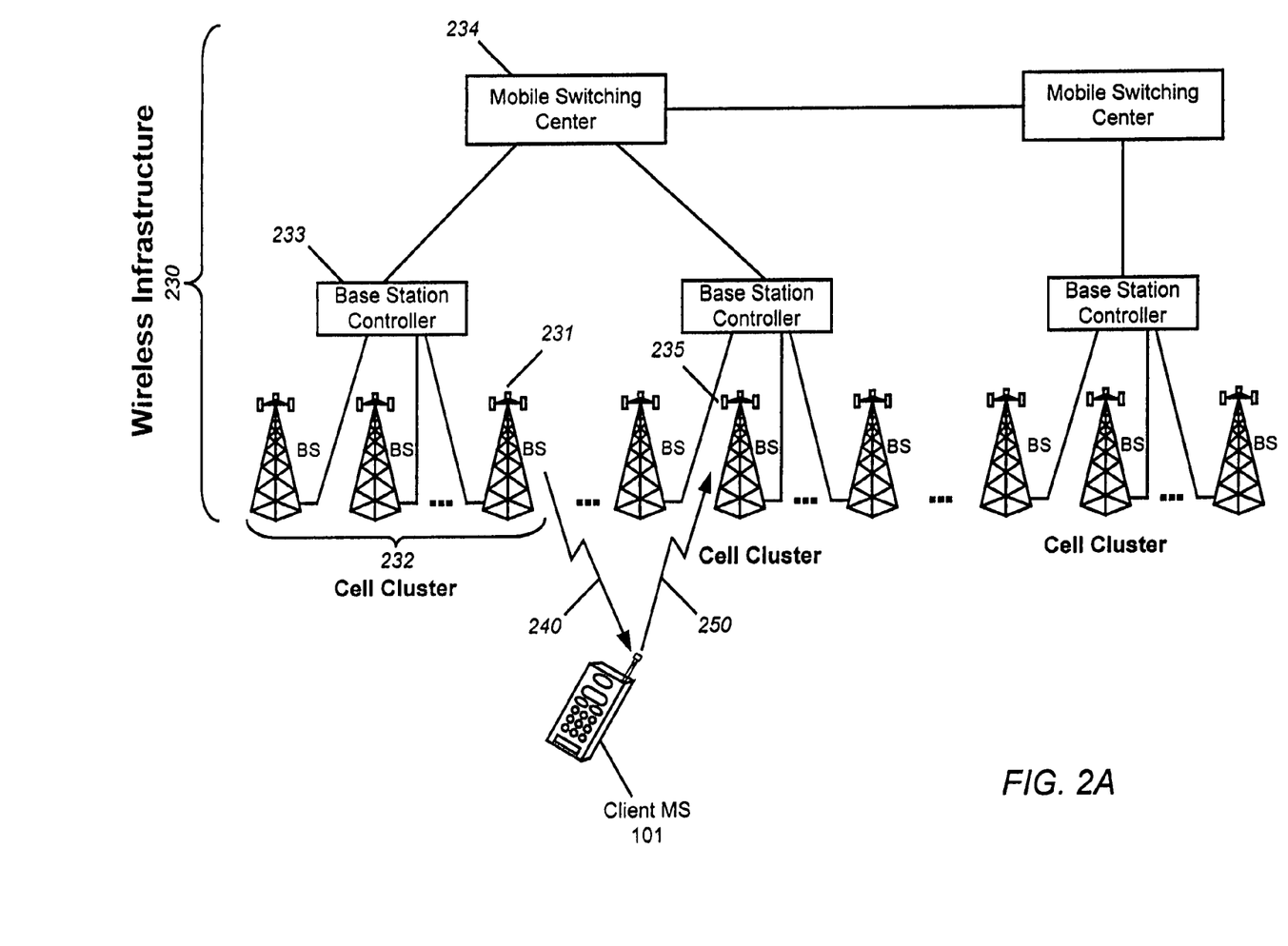
FIG. 2A depicts a mobile station utilizing a first embodiment of the invention in a wireless communication system.

FIG. 2A illustrates a first embodiment of the present invention. A client mobile station 101 is shown in communication with two different base stations 231 and 235 of the wireless infrastructure 230 through a forward link 240 and a reverse link 250, respectively. The feedback information such as the power control for the reverse link 250 is communicated by each base station to the other base station through network infrastructure entities including base station controllers (BSC) 233 that may control a cell cluster 232, and/or a mobile switching center (MSC) 234 that coordinates BSC's.

It should be noted that a given base station is typically comprised of multiple sectors, usually three. Each sector includes a separate transmitter and antenna (transceiver) pointed in a different direction. This embodiment therefore may also be implemented where the mobile station 101 is in communication with two different sectors of a single base station, as opposed to two separate base stations. In this situation, the feedback information is communicated between sectors of a single base station. Because the term base station (BS) is often used to generally identify a transceiver, it should be understood that the terms base station and sector are used herein somewhat interchangeably.

By targeting all or some of the reverse link transmissions to a different base station or sector than the base station or sector from which the forward link originates, the mobile station is afforded increased diversity. If one link temporarily fails, it does not necessarily mean that the other link will fail as in the case of limited diversity. It should be noted that in the case of the first embodiment, if a forward link channel bearing control information is not received by the mobile station, the mobile station may turn off the reverse link, i.e., control dependency exists. For example, if a forward channel bearing power control is not received for some short period of time, the reverse link may be turned off because it is no longer able to be efficiently power controlled. Alternatively, if a forward channel bearing acknowledgment is not received for a significant period of time, typically considerably longer than the power control period, the reverse link transmissions have gone unacknowledged and the reverse link may also be turned off. There is, however, at least a greater chance that the reverse link is still received by the other base station and a handoff request is more likely to be received earlier and prevent such conditions from arising. In other words, even though there is a chance that, if the forward link is not received, that the reverse link will need to be turned off, there is less chance of both links failing at the same time because the link dependency has been removed.

The statistical reasons are as follows. Presume that the probability of either the forward or reverse link from and to a particular base station failing is $P_s$. Without the diversity provided by the present invention, the chance of a failed connection is simply $P_s$. However, with the diversity provided by the present invention, the chance of the connections both failing (i.e., both the forward and reverse links) is reduced to $P_s^2$ because the links can operate independently.

Figure 2B:
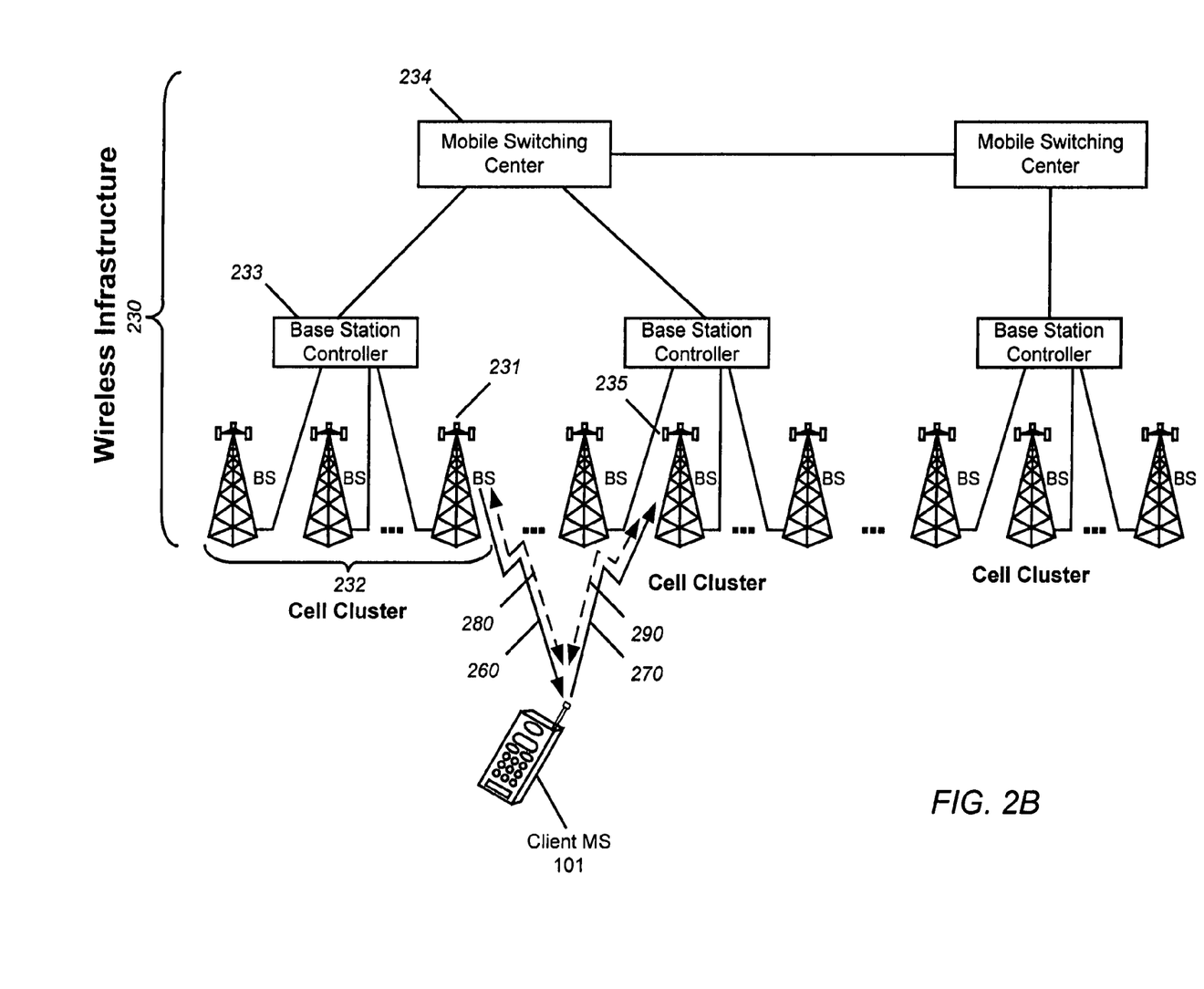
FIG. 2B depicts a mobile station utilizing a second embodiment of the invention in a wireless communication system.

FIG. 2B illustrates a second embodiment of the present invention. A client mobile station 101 is shown in communication with two different base stations 231 and 235 of the wireless infrastructure 230 through typical overhead and voice connections 280 and 290 as well as a forward link 260 for forward data communications and a reverse link 270 for reverse data communications, respectively.

Typical wireless systems like cdma2000 use separate channels for signaling/overhead information and data. In fast cell selection systems, the data channels (both forward and reverse) are directed to/from a single base station while the mobile station maintains signaling communications with a set of base stations. The single base station that is selected in fast cell selection is typically selected from eligible (or so-called active set sectors) that make up that set of base stations. One reason for this is that the data channels typically consume much more bandwidth and need to be rationed carefully while signaling is typically very low bandwidth. This high bandwidth requirement makes high-rate channels more susceptible to loss and power control constraints. In this embodiment, the mobile station maintains forward and reverse control channels from and to the set of eligible base stations or sectors as necessary, and the mobile station sets up a forward link high-rate data channel to base station A (BS 231 in FIG. 2B) in that eligible set and a reverse link high-rate data channel to base station B (not the same as base station A; BS 235 in FIG. 2B) that is also in that eligible/active set. By achieving diversity in this manner, upper-layer acknowledgment data such as TCP/IP acknowledgments are transmitted over a separate link than the high-rate data and the control signaling is maintained with the active set sectors while lower level feedback such as power control and frame error indications may be communicated to and from multiple base stations.

In the embodiment shown in FIG. 2B, a failure to receive the forward link 260 from base station 231 will not preclude the mobile station 101 from receiving reverse link feedback 290 from the other base station 235 to which the reverse link 270 is being transmitted. Therefore, the reverse link does not necessarily have to be turned off. This feature is also available in a third embodiment described below.

In the second embodiment, as in the first embodiment, reverse link control information devised by a base station receiving the reverse link transmission(s) must be conveyed to any other base station providing this feedback to the mobile station. For example, in the first embodiment, the feedback must be communicated from the receiving base station to the transmitting base station. In the second embodiment, two options are available.

First, the base stations transmitting feedback in soft-handoff may transmit feedback as in normal soft-handoff, i.e., power control information transmitted by any one base station is devised by that base station as appropriate depending on its receipt of the reverse channel in question.

Second, the base stations transmitting feedback in soft-handoff may transmit feedback as appropriate for the receiving base station. The receiving base station needs to provide that information to the other base stations in soft-handoff. This information may be provided through network infrastructure entities including base station controllers (BSC) 233 and/or a mobile switching center (MSC) 234 that coordinates BSC's. Such inter-base station communication may present practical challenges because of synchronized or short timing requirements such as immediate or fast power control feedback. However, this may be readily accomplished in sectors that have the same base station controller such as when all sectors are part of the same base station (called "softer-handoff").

The second option discussed above is advantageous over the first option, because power control for the reverse link will be more representative of the needs of the base station that is actually receiving the reverse link. Additionally, in the first option, the mobile station will need to be presented with rules for interpreting multiple conflicting power control commands. This may be resolved, for example, by the typical soft-handoff power control rule or by specifying that the mobile station should use the power control commands of the receiving base station unless unreceivable and in which case the power should be increased unless any other base station indicates power should be reduced.

Figure 3:
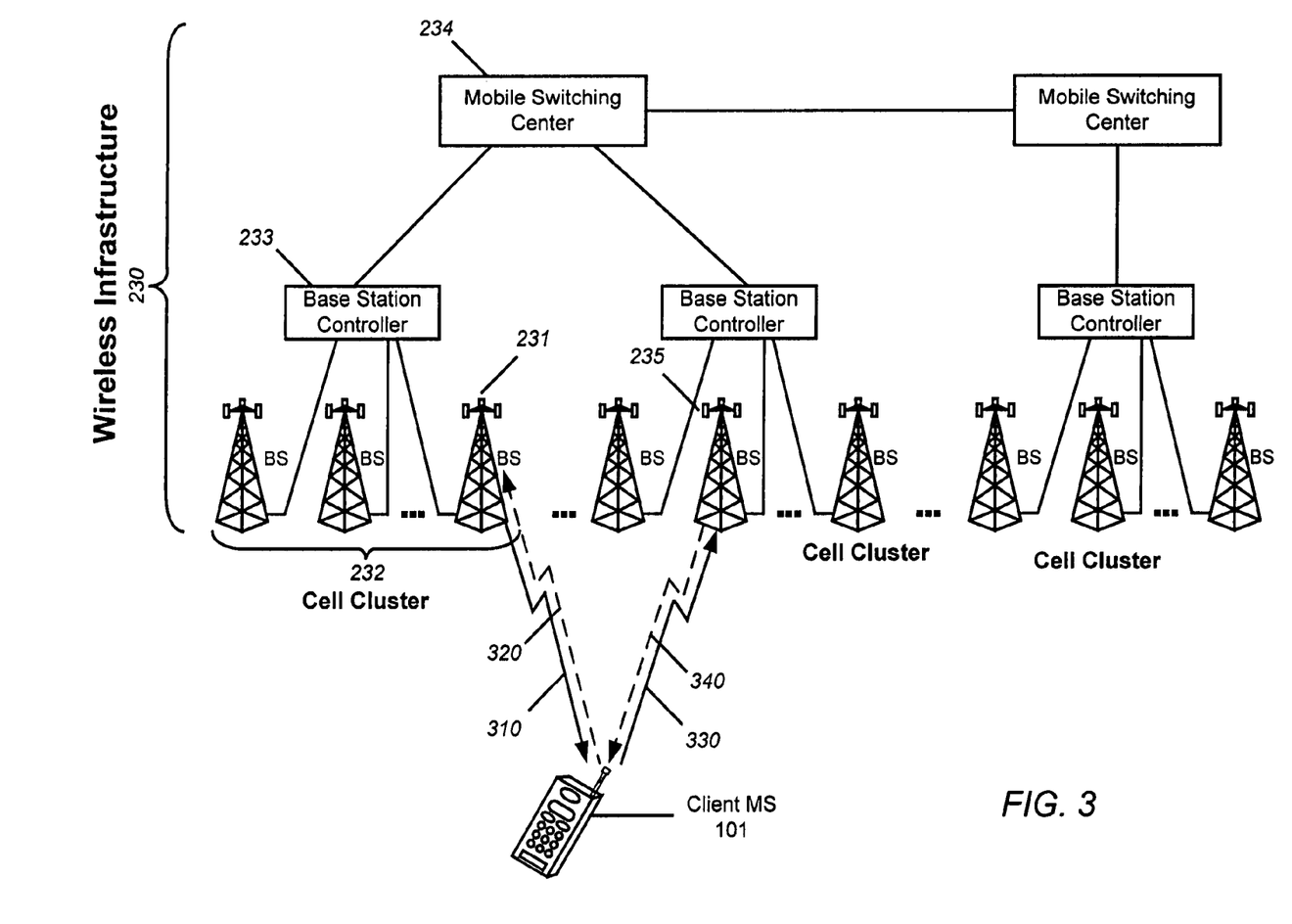
FIG. 3 shows a mobile station utilizing a third embodiment of the invention in a wireless communication system.

FIG. 3 depicts yet another embodiment of the invention. This embodiment comprises using pairs of forward and reverse link channels. In addition to separating the forward and reverse data channel links, the control associated with those links may be separated. There are two pairs of channels in this embodiment. The first pair of channels is in contact with a first base station 231, and comprises a forward traffic channel 310 that transports forward link data (voice or digital data for example), and a supporting low-bandwidth feedback reverse-link 320. The second pair of channels is in contact with a second base station 235 and comprises a reverse traffic channel 330 that transports reverse link data (voice or digital data for example), and a supporting low-bandwidth feedback forward link 340.

The embodiment illustrated in FIG. 3 has advantages over the embodiment illustrated in FIG. 2A, because there is no need to transmit feedback from one base station to another base station and the separated links are self-supporting because the traffic and control are to/from the same base station. In other words, both control and link independence are achieved. The embodiment illustrated in FIG. 3 has advantages over the embodiment illustrated in FIG. 2B because there is no need to transmit feedback from one base station to another base station and the links are fully separated and not redundant (i.e., lower complexity and lower bandwidth requirement).

This arrangement allows for each pair of channels to be self-contained, because the forward and reverse traffic channels 310 and 330 are supported by their respective low-bandwidth feedback links 320 and 340. Each of the low-bandwidth feedback links are for cell-site selection, power control, signal quality measurements, acknowledgements, as well as other possible messages. If, for example, the supporting low-bandwidth feedback links are for power control, then the power control does not need to be transmitted between the base stations, as in the first embodiment. Furthermore, in the event of a failure in one of the traffic channels, such as the reverse traffic channel 330, the supporting low-bandwidth feedback forward link 340 will continue to communicate power control information to MS 101. This prevents MS 101 from terminating communication because it is no longer power controlled.

If the reverse traffic channel 330 and the supporting low-bandwidth feedback forward link 340 both fail, the diversity afforded by having the two self-contained pairs of channels 310, 320 and 330, 340 reduces the chances for a failed connection for the reasons discussed above. The remaining forward traffic channel 310 and its supporting low-bandwidth feedback reverse link 320 may still be in communication with MS 101. Higher layer protocol processing, such as acknowledgment of a higher layer packet, can accordingly be maintained. Thus, although communication may be limited to the forward traffic channel 310 and the supporting low-bandwidth reverse link 320, this is sufficient to send a handoff message to MS 101 to establish a new reverse link with another base station or allow MS 101 to inform BS 231 of the need for another base station for the reverse link.

The supporting low-bandwidth feedback links are not limited to the communication of power control. As discussed, each of the supporting low-bandwidth feedback links can be for cell-site selection, signal quality measurements, acknowledgements, as well as other possible messages. The inclusion of such channels on the link will depend on a number of factors such as the type of connection. For example, the necessity of an acknowledgment channel will depend on the reliability of data transfer. A voice call that merely sends voice frames would not necessarily require an acknowledgement channel on the supporting low-bandwidth feedback link.

If, in fact, one or more acknowledgment channels are placed on a supporting low-bandwidth feedback link, the acknowledgement channels may be for Layer 1, 2 and/or 3. The number of acknowledgment channels will depend on the time dependency of the entire connection. A temporary failure affects the lower layers more. For example, TCP/IP acknowledgments may be considered as data traffic and sent on the opposing data link rather than the low-bandwidth feedback link associated with the channel the data is transported on.

The supporting low-bandwidth feedback links may include pilot channels. Pilot channels may be utilized in a number of different ways from coherent demodulation to bearing the power control or acting as reference levels. The necessity of a pilot channel on the supporting low-bandwidth feedback channel will depend on the type of connection. For example, power control may be transmitted on a pilot channel at very low-bandwidth. If the power control is thus transmitted as a subchannel on the pilot, the feedback link may contain a pilot channel.

The feedback link may also be used to signal that the mobile station is coming out of a control-hold mode. A control-hold mode is a state in which the mobile station is not sending traffic but is ready to send traffic. By sending such a signal through the supporting low-bandwidth feedback reverse link, the mobile station can inform base stations that it is coming out of a controlled hold and will transmit data.

The supporting low-bandwidth feedback links become more independent as the number of channels on the links increases. A supporting low-bandwidth feedback link that has a power control channel, an acknowledgment channel and a pilot channel is more independent than a supporting low-bandwidth feedback link that only has a power control channel. Furthermore, a more independent feedback link allows a mobile station to distribute higher layer packets of data and acknowledgment in a robust manner. For example, if the supporting low-bandwidth feedback reverse link 320 has an acknowledgment channel, it is possible for MS 101 to distribute higher layer packets between the reverse traffic channel 330 and the supporting low-bandwidth feedback forward link 320. The higher layer data packets are distributed to the reverse traffic channel 330 while the acknowledgement packets are distributed to the supporting low-bandwidth feedback reverse link 320.

The distribution of the signaling and data packets from logical channels to physical channels can be achieved by the Medium Access Control (MAC) sublayer of MS 101. The MAC maps logical channels to physical channels for transmission on the forward link and maps physical data received on the reverse link physical channels to logical channels. Fo example, signaling and data, being different logical information, may be combined onto the same physical channel by the MAC layer and subsequently divided at the receiving end back into separate logical information for upper layers to handle. Alternatively, a MAC layer could distribute different logical channels/information onto different physical channels that are directed to different base stations as appropriate for an uplink/downlink diversity scheme according to the embodiments described.

Mobile stations may employ any of the diversity schemes discussed in the above embodiments. However, it is not necessary for such mobile stations to always operate within a given diversity scheme. A diversity scheme may be implemented by a mobile station only in situations that necessitate diversity. For example, each of the previously described embodiments can be modified such that the diversity scheme is activated only in signal conditions that have a certain predefined value or mobile station locations that exhibit a sufficient chance of experiencing a forward or reverse link failure. If a connection has a high probability of failure as defined by a threshold measure based on frame error rate, symbol error rate, combined signal strength or acknowledgment failure count, then a diversity scheme is activated forcing the mobile station to choose different forward and reverse links.

Also, the purposeful selection of different sectors for reverse link and forward link may only be used when more than one sector has link-quality within an appropriate range or the degrading effect of the increased power on capacity is acceptable.

Figure 6:
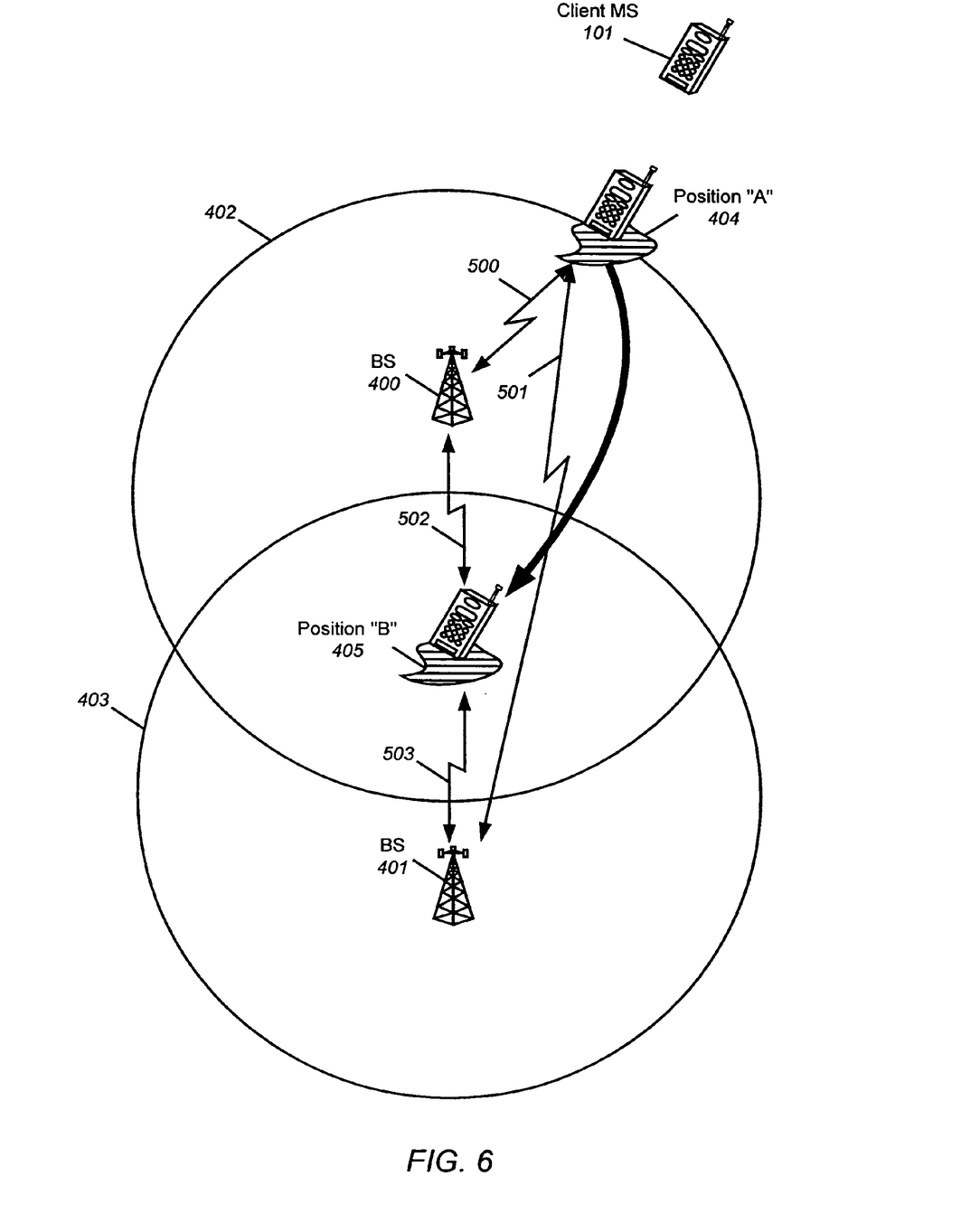
FIG. 6 illustrates a roving mobile station between two different base stations in a wireless communication system.

FIG. 6 illustrates two BS 400 and 401 with corresponding circles of coverage 402 and 403. A MS 101 roves through the geographic area served by BS 400 and 401. In the course of such roving, MS 101 travels to position A 404 at the edge of the coverage area 402 for BS 400. Because MS 101 is at the edge of the coverage area 402, there is a high probability of failure. However, a diversity scheme at position A 404 based on the second embodiment (for example) will require MS 101 to transmit to BS 400 and BS 401 on links 500 and 501, respectively. The transmission to BS 401 will require increased power and the signal strength will be much weaker than the signal strength to BS 400 due to distance and potential interference between the signals. Thus, given the location of MS 101 relative to BS 400 and 401, a diversity scheme will not be activated.

On the other hand, as MS 101 travels to position B 405, it is approximately equidistant to BS 400 and 401. At this position, diversity may be activated, because there is no significant degrading effect of the increased power on capacity nor is there any difference in signal strengths. The potential for interference between the signals is also minimal at this position.

The location of the mobile stations relative to the base stations for activating diversity may be determined in a number of ways, including measuring pilot strength, determining pilot phase offsets and using position location information. For example, if the mobile station detects that two or more pilots have strength exceeding a given threshold (and optionally that those pilot strengths are within some predetermined range of one another, i.e., significantly equal), then diversity may be activated. The reason for checking if the strengths are significantly equal is to make sure that one base station is not much further away than another base station. In they are, as illustrated as position "A" 404 in FIG. 6, the communication with BS 401 may cause undue interference. This condition may also be detected using the pilot phase offsets. If the pilot phase from BS 400 is significantly offset from the pilot phase from BS 401, in the absence of severe multipath, this provides an indication of a significant difference in distance to BS 400 versus BS 401. Alternatively, position location information through, for example, Global Positioning System (GPS) may be also be used.

A typical mobile station in a cdma2000 network uses pilot strength energy to select or request handoff to different base stations. A similar method may be employed to activate or deactivate a diversity scheme according to the present invention. For example, the mobile station may select the best sector for the link (forward or reverse) that has the highest rate or quality of service requirement. Thereafter, the mobile station may select the second best sector for the opposite link. Suppose, for example, that the forward link requires the highest rate due to a user requested download while the reverse link is required to carry upper-layer signaling such as TCP/IP acknowledgments. In this case, the best sector is selected to serve the forward link while the second best sector is selected to serve the reverse link.

Activation of diversity may be triggered upon recognition that a diversity situation may be exploited regardless of whether the connection is an at-risk connection. The determination of the availability of a diversity situation may be made in the same manner discussed above, such as by measuring pilot strength, determining pilot phase offsets or using position location information.

Any combination of the location or conditions of the mobile station relative to the base stations and the probability of link failure used for determining the activation of a diversity scheme (as discussed above) may also be utilized in determining the deactivation of a diversity scheme.

Figure 7A:
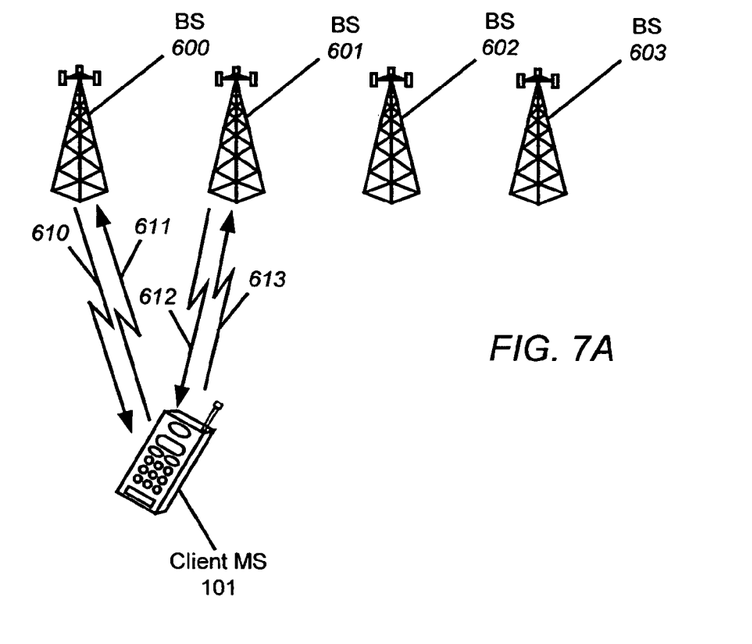
FIGS. 7A and 7B illustrate a mobile station utilizing the first embodiment of the invention in the case of a soft handoff.

Although the present invention has been described using fast cell-site selection in which a base station is chosen from an active set of base stations, it is clear that the present invention may be used in the case of a soft handoff. FIG. 7A depicts MS 101 and four base stations BS 600, BS 601, BS 602 and BS 603 that are in an active set. For overhead and voice purposes, MS 101 is in a soft handoff will all of these base stations (links not shown). However, for data communications, MS 101 communicates with only two of the four base stations, BS 600 and BS 601. MS 101 and BS 600 are in contact through the forward link 610 and the reverse link 611. At the same time, MS 101 and BS 601 are in contact through the forward link 612 and the reverse link 613.

Figure 7B:
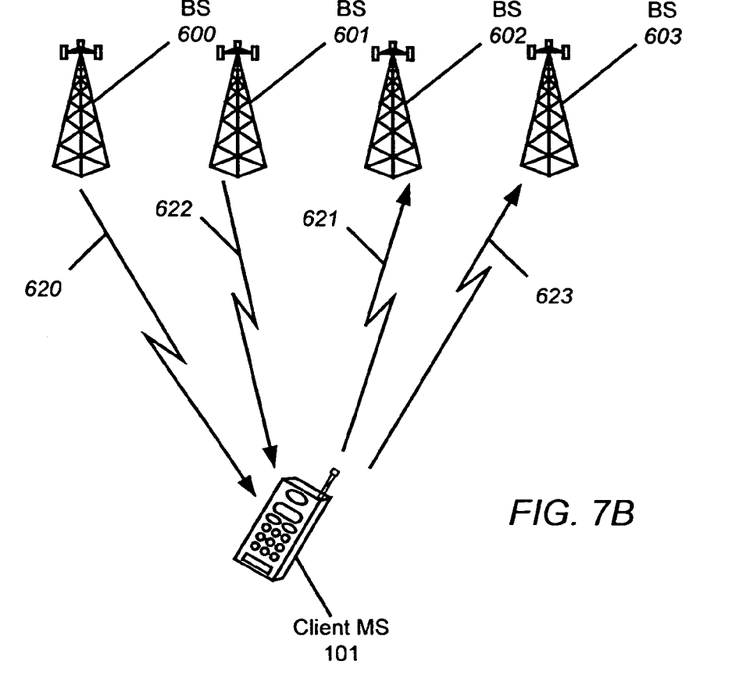

In this situation, diversity may be activated for any of the reasons discussed above. As a result, the forward and reverse link pairs may be divided between two stations as illustrated in FIG. 7B. BS 600 transmits to MS 101 on the forward link 620 while MS 101 transmits to BS 602 on the reverse link 621. MS 101 is also in contact with BS 601 and 603 through the forward link 622 and the reverse link 623, respectively. Thus, forward and reverse links may originate from and be transmitted to multiple base stations within an active set. It should be noted that the set of base stations from which the forward links originate and the set of base stations to which the reverse links are transmitted may overlap with some of the base stations being in both sets.

Although the present invention has been described using a CDMA wireless network, it is clear that this technique could be utilized in any wireless system comprising a multiplicity of base stations and at least one client. In addition, although the present invention was described as transporting voice or data traffic, it is clear that it could also be used to more easily transport TCP/IP or UDP/IP traffic independently for different directions as well as to transport other types of traffic.

Although the present invention has been fully described in connection with a mobile station implementing diversity, it is clear that a network can implement diversity in communication with a mobile station.

Although the present invention has been fully described in connection with the preferred embodiments thereof with reference to the accompanying drawings, it is to be noted that various changes and modifications will become apparent to those skilled in the art. Such changes and modifications are to be understood as being included within the scope of the present invention as defined by the appended claims.

What is claimed is:

1. In a communications network having a plurality of sectors and a mobile station, a method for communication comprising:
   establishing a connection between the mobile station and a first sector by transmitting traffic from the first sector to the mobile station on a forward link and from the mobile station to the first sector on a reverse link;
   detecting an available connection between the mobile station and a second sector; and
   in response to the step of detecting the available connection, dividing the forward and reverse links of the connection between the first sector and the second sector wherein traffic on the forward link is transmitted from one of the first and second sectors and traffic on the reverse link is transmitted to the other sector.

2. The method as recited in claim 1 wherein, upon the step of dividing, traffic on the forward link comprises feedback information for the reverse link and traffic on the reverse link comprises feedback information for the forward link.

3. The method as recited in claim 1 wherein the traffic comprises data and the mobile station transmits and receives feedback information to and from both the sector transmitting on the forward link and the sector for the reverse link.

4. The method as recited in claim 1 further comprising:
   establishing a second reverse link for transmitting feedback information for the forward link, said second reverse link transmitting feedback information from the mobile station to the sector transmitting on the forward link; and
   establishing a second forward link for transmitting feedback information for the reverse link, said second forward link transmitting feedback information from the sector for the reverse link to the mobile station.

5. The method as recited in claim 1 wherein the step of detecting the available connection comprises determining the location of the mobile station relative to the first and second sectors.

6. The method as recited in claim 5 wherein the step of determining the location of the mobile station comprises measuring the pilot strength from the first and second sectors.

7. The method as recited in claim 6 wherein the step of measuring the pilot strength from the first and second sectors comprises determining whether the pilot strengths are within a predetermined range.

8. The method as recited in claim 5 wherein the step of determining the location of the mobile station comprises measuring the pilot phase offsets from each of the first and second sectors.

9. The method as recited in claim 5 wherein the step of determining the location of the mobile station comprises obtaining a position information reading for the mobile station.

10. A mobile station in a communications network having a plurality of sectors, the mobile station comprising:
    a processor programmed for establishing a connection between the mobile station and a first sector by receiving traffic from the first sector to the mobile station on a forward link and by transmitting traffic from the mobile station to the first sector on a reverse link, detecting an available connection between the mobile station and a second sector and, in response to detecting the available connection, dividing the forward and reverse links of the connection between the first sector and the second sector wherein traffic on the forward link is received from one of the first and second sectors and traffic on the reverse link is transmitted to the other sector.

11. The mobile station as recited in claim 10 wherein, upon the processor dividing the forward and reverse links, traffic on the forward link comprises feedback information for the reverse link and traffic on the reverse link comprises feedback information for the forward link.

12. The mobile station as recited in claim 10 wherein the traffic comprises data and the processor is programmed to transmit and receive feedback information to and from both the sector transmitting on the forward link and the sector for the reverse link.

13. The mobile station as recited in claim 10 wherein the processor is further programmed for establishing a second reverse link for transmitting feedback information for the forward link, said second reverse link transmitting feedback information from the mobile station to the sector transmitting on the forward link, and establishing a second forward link for transmitting feedback information for the reverse link, said second forward link transmitting feedback information from the sector for the reverse link to the mobile station.

14. The mobile station as recited in claim 10 wherein the processor is programmed to determine the location of the mobile station relative to the first and second sectors in detecting the available connection.

15. The mobile station as recited in claim 14 wherein the processor is programmed to measure the pilot strength from the first and second sectors in determining the location of the mobile station.

16. The mobile station as recited in claim 15 wherein the processor is programmed to determine whether the pilot strengths are within a predetermined range in measuring the pilot strength from the first and second sectors.

17. The mobile station as recited in claim 14 wherein the processor is programmed to measure the pilot phase offsets from each of the first and second sectors in determining the location of the mobile station.

18. The mobile station as recited in claim 14 wherein the processor is programmed to obtain a position information reading for the mobile station in determining the location of the mobile station.

19. A communications network having a plurality of sectors and a mobile station, the network comprising:
   a processor programmed for establishing a connection between the mobile station and a first sector by transmitting traffic from the first sector to the mobile station on a forward link and by receiving traffic from the mobile station to the first sector on a reverse link, detecting an available connection between the mobile station and a second sector and, in response to detecting the available connection, dividing the forward and reverse links of the connection between the first sector and the second sector wherein traffic on the forward link is transmitted from one of the first and second sectors and traffic on the reverse link is received by the other sector.

20. The network as recited in claim 19 wherein, upon the processor dividing the forward and reverse links, traffic on the forward link comprises feedback information for the reverse link and traffic on the reverse link comprises feedback information for the forward link.

21. The network as recited in claim 19 wherein the traffic comprises data and the processor is programmed to transmit and receive feedback information to and from both the sector transmitting on the forward link and the sector for the reverse link.

22. The network as recited in claim 19 wherein the processor is further programmed for establishing a second reverse link for transmitting feedback information for the forward link, said second reverse link transmitting feedback information from the mobile station to the sector transmitting on the forward link, and establishing a second forward link for transmitting feedback information for the reverse link, said second forward link transmitting feedback information from the sector for the reverse link to the mobile station.

23. The network as recited in claim 19 wherein the processor is programmed to determine the location of the mobile station relative to the first and second sectors in detecting the available connection.

24. The network as recited in claim 23 wherein the processor is programmed to measure the pilot strength from the first and second sectors in determining the location of the mobile station.

25. The network as recited in claim 24 wherein the processor is programmed to determine whether the pilot strengths are within a predetermined range in measuring the pilot strength from the first and second sectors.

26. The network as recited in claim 23 wherein the processor is programmed to measure the pilot phase offsets from each of the first and second sectors in determining the location of the mobile station.

27. The network as recited in claim 23 wherein the processor is programmed to obtain a position information reading for the mobile station in determining the location of the mobile station.

\* \* \* \* \*